P. L. WRAY.
FASTENING OF BRACELETS AND THE LIKE.
APPLICATION FILED JUNE 28, 1915.

1,193,330.

Patented Aug. 1, 1916.
2 SHEETS—SHEET 1.

Witnesses.
A. Pauline Davis
W. Wallace Nairn Jr.

Inventor
Percy Lassan Wray
By Dowell & Dowell
Attorneys

P. L. WRAY.
FASTENING OF BRACELETS AND THE LIKE.
APPLICATION FILED JUNE 28, 1915.

1,193,330.

Patented Aug. 1, 1916.
2 SHEETS—SHEET 2.

Witnesses.
A. Pauline Davis
W. Wallace Nairn Jr

Inventor.
Percy Cassan Wray
By Dowell & Dowell
Attorneys

UNITED STATES PATENT OFFICE.

PERCY LASSAU WRAY, OF MIDDLE PARK, SOUTH MELBOURNE, MELBOURNE, VICTORIA, AUSTRALIA, ASSIGNOR TO THOMAS WILLIAM TILBURY AND NORMAN COMPER, TRADING AS THE TILBURY MANUFACTURING COMPANY, OF MELBOURNE, VICTORIA, AUSTRALIA.

FASTENING OF BRACELETS AND THE LIKE.

1,193,330.       Specification of Letters Patent.       Patented Aug. 1, 1916.

Application filed June 28, 1915. Serial No. 36,760.

*To all whom it may concern:*

Be it known that I, PERCY LASSAU WRAY, a subject of the King of Great Britain and Ireland, and a resident of the post-town of Middle Park, a district of the city of South Melbourne, a suburb of the city of Melbourne, in the county of Bourke, State of Victoria, Commonwealth of Australia, (whose post-office address is Nimmo street, in the said post-town of Middle Park,) have invented certain new and useful Improvements Relating to the Fastening of Bracelets and the like, to be as follows.

This invention relates to what may be termed the rigid type of bracelet in contradistinction to chain and other flexible classes, the term "bracelet" being intended to include all like articles.

The object of this invention is to provide in a cheap, simple manner for the fastening of a rigid bracelet so that the liability of its becoming unfastened inadvertently is reduced to a minimum. The bracelet may also be quickly applied or removed but is not liable to open if snatched at by thieves. In addition no protuberances, chains or extraneous devices need be employed.

The term "rigid" herein used is not intended to be construed in a strict sense as according to the invention the halves of a bracelet must each be capable of slight compression and expansion. The essence of the invention resides in the necessity of radially displacing or decentering the meeting ends of the two halves of a bracelet relatively to each other before the same can be opened. This is effected either by impressing one end or out-pressing the other meeting end. It is also to be understood that the invention may be applied to other articles and is not limited to bracelets.

Figure 1:
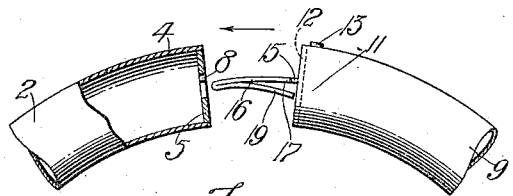
Figure 2:
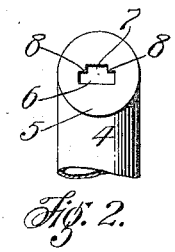
Figure 3:
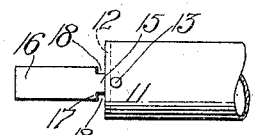
Figure 4:
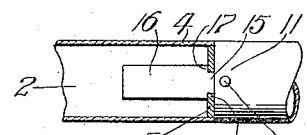
Figure 5:
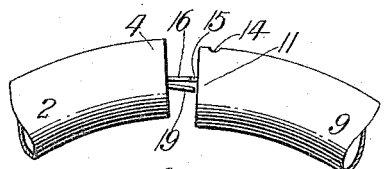
Figure 6:
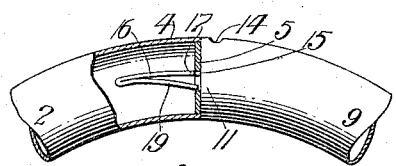
Figure 7:
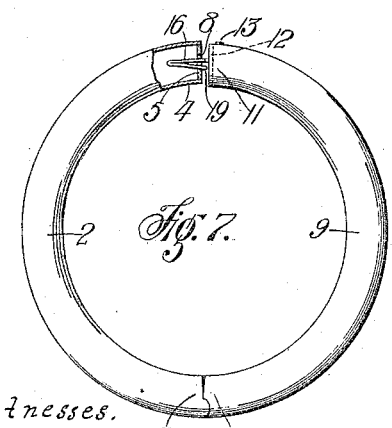
Figure 8:
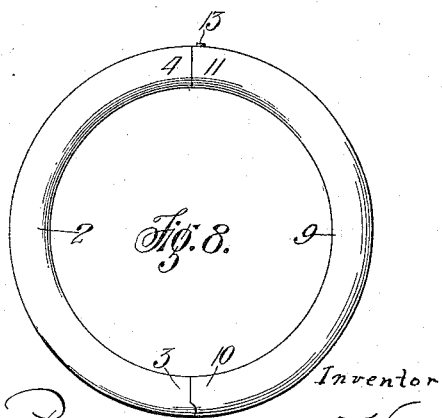
Figure 9:
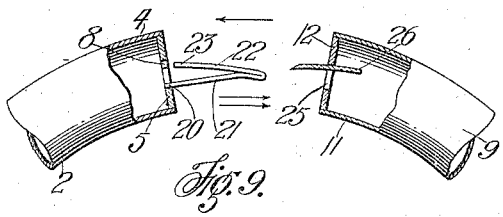
Figures 10, 11:
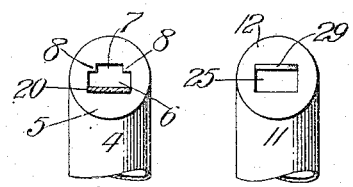
Figure 12:
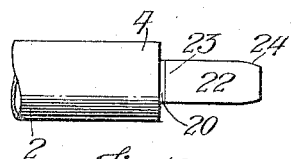
Figure 13:
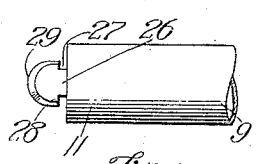
Figure 14:
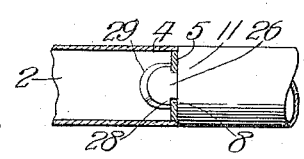
Figure 15:
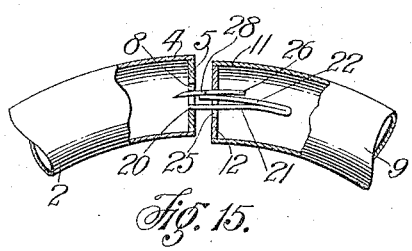
Figure 16:
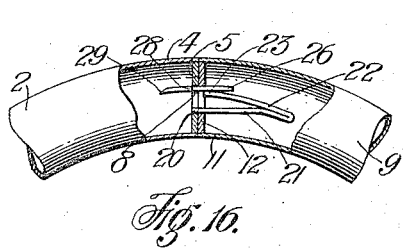
Figure 17:
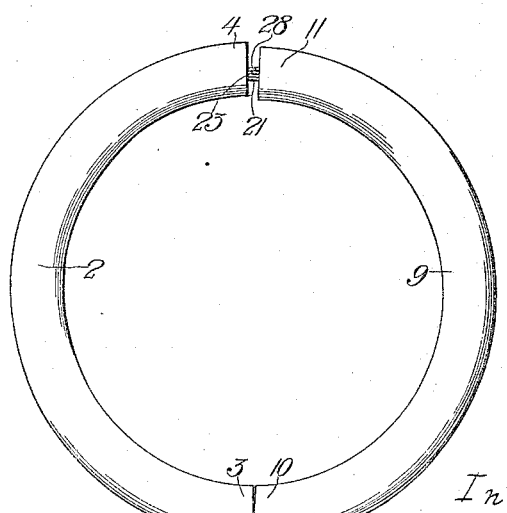

Referring to the drawings which form a part of this specification:—Figure 1 is an enlarged part sectional detail view showing the negative and positive meeting ends of a bracelet separated. Fig. 2 is an end view of the negative meeting end, looking in the direction of the arrow, Fig. 1. Fig. 3 is a plan of the positive meeting end. For convenience of illustration a spring tongue has been omitted. Fig. 4 is a part sectional plan showing the negative and positive meeting ends closed and united. Fig. 5 is a detail view showing the meeting ends of a bracelet being closed. They are therefore de-centered or radially de-alined in relation to each other. An indication groove is also seen in lieu of an indication protuberance. Fig. 6 is a part sectional side view showing the meeting ends closed or united and in alinement. Fig. 7 is a part sectional side view of a bracelet partially closed and showing the meeting ends radially de-alined. Fig. 8 is a side view of a bracelet closed, the meeting ends being in alinement. Fig. 9 is an enlarged part sectional detail view showing the negative and positive meeting ends of a modification separated. Fig. 10 is a part sectional end view of the negative meeting end of the modification, looking in the direction of the single arrow, Fig. 9. Fig. 11 is a part sectional end view of the positive meeting end of the modification, looking in the direction of the pair of arrows, Fig. 9. Fig. 12 is a plan of the negative meeting end of the modification. Fig. 13 is a plan of the positive meeting end of the modification. Fig. 14 is a part sectional plan showing the negative and positive meeting ends of the modification closed or united. Fig. 15 is a part sectional detail view showing the meeting ends of the modification being closed. They are therefore radially de-alined or de-centered in relation to each other. Fig. 16 is a part sectional side view showing the meeting ends closed or united and in alinement. Fig. 17 is a side view of a bracelet partially closed and showing the meeting ends radially de-alined or de-centered.

The invention includes (Figs. 1 to 8) a bracelet consisting of a first half 2 having a hinging end 3 and a negative meeting end 4. The bracelet is preferably hollow the negative meeting end being closed by a plate 5. Formed in the plate 5 is a major elongated lateral opening, indicated at 6. Communicating with the major opening is a minor elongated lateral opening, indicated at 7. Disposed above the major opening 6 and at each side of the minor opening 7 are shoulders 8. The bracelet also includes a second half 9 having a hinging end 10 and a positive meeting end 11 closed by a plate 12. Carried by the positive meeting end 11 may be an indication protuberance 13. Or an indication groove 14 may be provided in lieu of the said protuberance.

Projecting from the closing plate 12 is the laterally reduced root 15 of a locking tongue 16. Formed by the reduced root 15 and at each side thereof are shoulders 17 forming gullets 18. Integral with the outer end of the locking tongue 16 is the root of a spring tongue 19 the inner end of which closely adjoins the closing plate 12.

In a modification (Figs. 9 to 17) the major elongated lateral opening 6 of the closing plate 5 has secured therein the root or inner end 20 of the inner member 21 of a spring tongue. Integral with or secured to the outer end of the inner member 21 is the outer end of an outer member 22 having a free inner end 23. The outer ends of the inner and outer members 21 and 22 may be tapered or converge as at 24. In the modification, further, the closing plate 12 has formed therein an elongated lateral opening indicated at 25. Secured in the opening 25 and to the closing plate 12 is a locking tongue having a laterally reduced inner end or root 26. Formed by the reduced root of the locking tongue are opposite gullets indicated at 27 which form shoulders 28. The outer end of the locking tongue is reduced or tapered and also rounded, as at 29.

To close a bracelet constructed according to this invention it is only necessary to move the meeting ends 4 and 11 toward each other. In the embodiment described with reference to Figs. 1 to 8 the locking tongue 16 enters into the major opening 6 of the closing plate 5. As the meeting ends continue to move toward each other the said tongue 16 bears against the shoulders 8 the spring tongue 19 bearing against the bottom of the major opening 6. The spring tongue is compressed. As the ends continue to meet and the tongue 16 moves into the first half 2 of the bracelet the meeting ends are radially de-alined as indicated in Figs. 5 and 7. When, however, the shoulders 8 reach the gullets 18 of the locking tongue 16 the meeting ends assume or spring back into an alined position. The shoulders 17 then bear behind the shoulders 8 which are disposed in the gullets 18. To open the bracelet it is first necessary to radially de-aline or de-center the meeting ends thereof. This may be effected by in-pressing the positive meeting end 11 and the shoulders 8 will be out-sprung from the gullets 18. Similarly by out-pressing the negative meeting end 4 the locking tongue 16 is released. It is impossible to part the meeting ends 4 and 11 without first radially de-alining them. The indication protuberance 13 or groove 14 informs the wearer which meeting end requires in-pressing.

In the modification (Figs. 9 to 17) the procedure in manipulating the bracelet is the same, but when the meeting ends 4 and 11 move toward each other the outer end 29 of the locking tongue bears upon the outer member 22 of the spring tongue compressing the said outer member toward the inner member 21. The reduced outer end 29 then passes beneath the shoulders 8 which spring into the gullets 27 when the bracelet is closed. It will be seen that in closing the bracelet in the modification the inner member 21 of the spring tongue bears upon the bottom of the elongated lateral opening 25 and when the bracelet is closed the outer member 22 of the spring tongue bears against the root or inner end 26 of the locking tongue.

Having now described my invention what I claim as new and desire to secure by Letters Patent is:—

1. Improvements relating to the fastening of bracelets and the like, consisting in a bracelet having a first half and a second half hinged together, said first half having a negative meeting end, a plate closing said end, said plate having an opening therein provided with shoulders, a spring tongue having an inner member secured in said opening and an outer member having a free end adjoining the closing plate, said second half having a positive meeting end, a plate closing said end, said plate having an opening therein to pass the spring tongue, a locking tongue projecting from said opening of said positive end, said tongue having gullets formed therein to receive the shoulders of the negative end.

2. Improvements relating to the fastening of bracelets and the like consisting in a bracelet having a first half and a second half hinged together, said first half having a negative meeting end, a plate closing said end, said plate having a major opening formed therein, said plate having a minor opening formed therein communicating with the major opening, shoulders disposed at each side of the minor opening, a spring tongue projecting from the closing plate of the negative end, said tongue comprising an inner member secured to the plate and an outer member having a free end adjoining the plate, said second half having a positive meeting end, a plate closing said end, said plate having an opening formed therein to receive the spring tongue, a locking tongue projecting from said plate, said tongue having gullets formed therein and shoulders formed by the gullets to engage the shoulders of the negative end.

3. An improved bracelet or the like having first and second halves hinged together and capable of being sprung radially out of alinement or de-centered at their meeting ends, and a locking tongue projecting from the meeting end of the one half and adapted to enter into the end of the other half and lock said meeting ends together until one of them is forcibly radially displaced or decentered relative to the other.

4. Improvements relating to the fastening of bracelets and the like, consisting in a bracelet having a first half, a second half hinged thereto, said first half having a negative meeting end, shoulders disposed in said negative end, said second half having a positive meeting end, a locking tongue carried by the positive end, and shoulders formed upon the locking tongue and engaging the shoulders in the negative end, said tongue holding the parts together but capable of being disengaged by forcibly moving the end of one half radially relatve to the end of the other half, substantially as described.

5. Improvements relating to the fastening of bracelets and the like, consisting in a bracelet having a first half and a second half hinged together, said first half having a negative meeting end, a plate closing said end, having communicating major and minor openings formed therein, said second half having a positive meeting end, a plate closing said positive end, a locking tongue projecting from said plate, and having a root and gullets forming shoulders adjacent the root, and a spring tongue carried by the locking tongue and having a free end adjoining the closing plate of the positive end of the bracelet, the first and second halves being capable of being radially sprung out of alinement at their meeting ends to disengage the locking tongue, substantially as described.

6. A bracelet having a first half, a second half hinged thereto, said first half having a negative meeting end provided with an opening having shoulders, a spring tongue projecting from said opennig, the other half having a positve end provided with an opening to pass the spring tongue, a locking tongue projecting from said positive end at said opening, and shoulders formed upon the said locking tongue and adapted to engage the shoulders in the negative end.

In testimony whereof I have hereunto affixed my signature in the presence of two subscribing witnesses.

PERCY LASSAU WRAY.

Witnesses:
CECIL McCLASTRIER,
FRANK H. CAIN.